United States Patent [19]
Klopotek

[11] Patent Number: 5,200,970
[45] Date of Patent: Apr. 6, 1993

[54] METHODS AND COMPOSITIONS FOR PROTECTING LASER EXCITATION GASES FROM CONTAMINATION

[75] Inventor: Peter J. Klopotek, Framingham, Mass.

[73] Assignee: Summit Technology, Inc., Waltham, Mass.

[21] Appl. No.: 621,285

[22] Filed: Dec. 3, 1990

[51] Int. Cl.$^5$ .............................................. H01S 3/22
[52] U.S. Cl. ...................................... 372/55; 372/56; 372/57
[58] Field of Search ................................ 372/55-57

[56] References Cited

U.S. PATENT DOCUMENTS

| | | | |
|---|---|---|---|
| 4,340,617 | 7/1982 | Deutsch et al. | 427/53.1 |
| 4,713,825 | 12/1987 | Adsett | 372/55 |
| 4,718,072 | 1/1988 | Marchetti et al. | 372/55 |
| 4,888,203 | 12/1989 | Rothschild et al. | 427/53.4 |
| 5,007,064 | 4/1991 | Seddon | 372/55 |

OTHER PUBLICATIONS

Tennant et al., Long-life maintenance-free excimer lasers, Abstract TUU1 (Apr. 1988), 1 page, *Proceeding of the Conference on Laser Eng. and Optics.*

Cali et al., "Flash evaporation of compounds with a pulsed-discharge $CO_2$ laser," vol. 15, *Applied Optics*, pp. 1327-1330 (May 1976).

Beaty, "Thin Films," *Handbook of Materials in Processes for Electronics*, pp. 11-1 to 11-59 Harper Ed., (1970).

Primary Examiner—Georgia Y. Epps
Attorney, Agent, or Firm—Thomas J. Engellenner

[57] ABSTRACT

Plastic or polymeric materials can be rendered substantially more practical for use in gas laser systems, and the problem of gas contamination due to outgassing of volatile materials can be significantly reduced by coating the polymeric elements with a thin dielectric film.

7 Claims, 1 Drawing Sheet

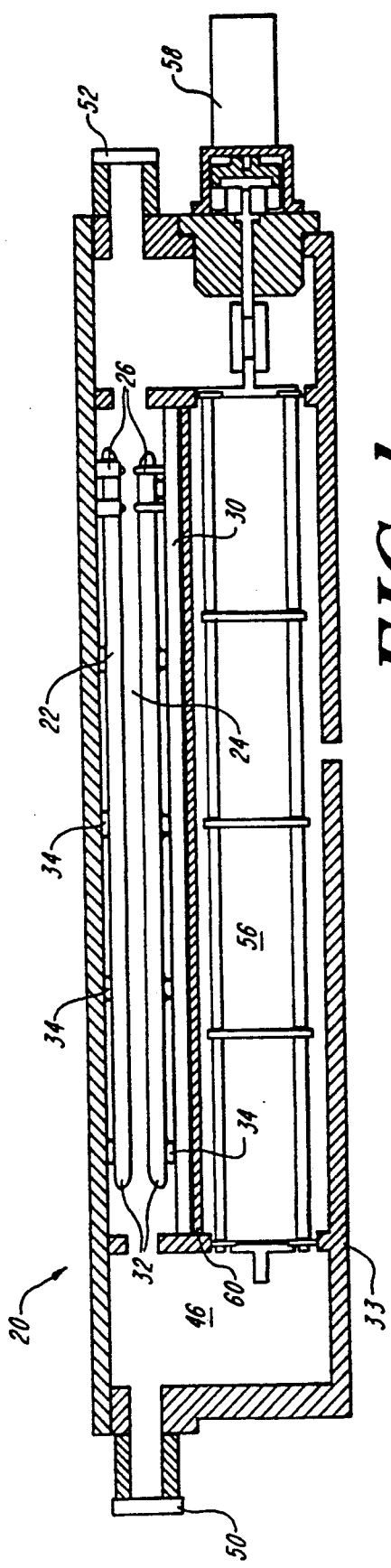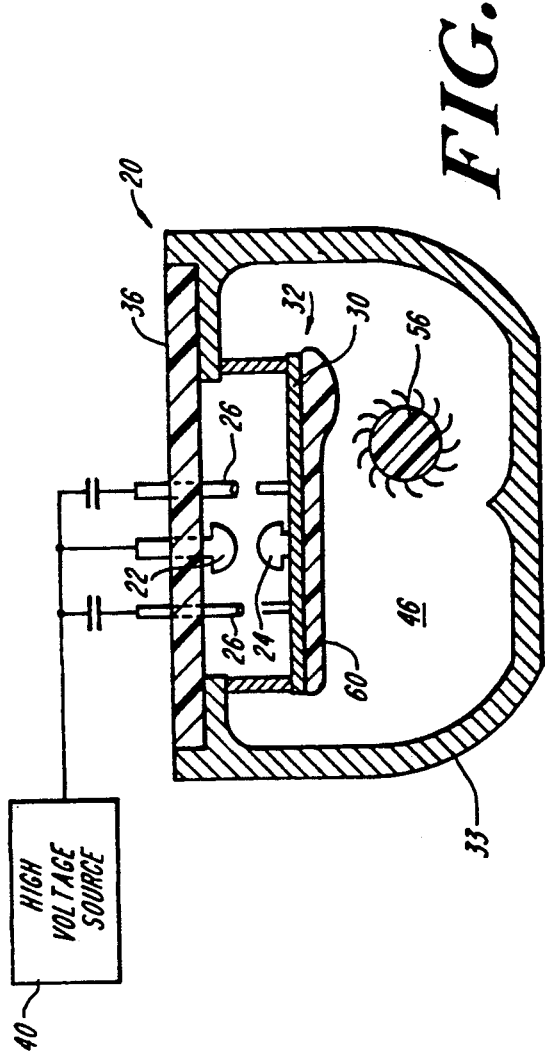

METHODS AND COMPOSITIONS FOR PROTECTING LASER EXCITATION GASES FROM CONTAMINATION

BACKGROUND OF THE INVENTION

The technical field of the invention is laser systems and, more particularly, the conservation of excitation media in gas lasers.

Gas lasers typically rely upon a pressurized gas which is excited to a light-emitting state by a high voltage electrical pulse. The chamber of a gas laser is usually constructed such that a small volume of the working gas medium is confined in a discharge zone between two electrodes. A small portion of the gas in the chamber is consumed in the electrical process of generating each laser pulse. A circulatory system (e.g., a fan or blower) continually recycles fresh gas into the discharge zone.

The gas in such a system undergoes a slow process of degradation, and eventually the energy produced by the laser pulses decreases. When the performance of the laser decreases below a threshold output energy level or the beam profile is degraded or shot-to-shot energy variations are observed, the gas in the chamber must be replaced with new gas.

The length of time a laser can operate without requiring the gas in the chamber to be replaced is called the gas lifetime. This length of time is a critical factor in the operation and value of gas lasers.

The present invention is directed toward fabricating excitation chambers which provide longer gas lifetimes than those of present laser systems.

The gas lifetime is related to the materials within the chamber which come in contact with the gas. The type of materials that form the structural elements of the chamber have a significant impact on the gas lifetime. The excitation chambers and the elements within it can be constructed out of various materials, such as metals, ceramics and plastics.

Most metals have little effect on the degradation of a gas in a chamber. However, metal components are typically expensive and are ill-suited for those elements of the chamber which come in close contact with the discharge zone because they can induce electrical arcing.

Ceramic materials, likewise, have little effect on the working medium, and because of their dielectric properties, can be used without risk of electrical discharges. However, ceramic materials are also expensive and difficult to fabricate in complex shapes. Moreover, because of their brittle nature, they are unsuitable for moving parts (such as blowers) or for parts that experience mechanical stresses.

Plastics also present problems in use. Several types of plastics are commonly used in the construction of laser excitation chambers in lasers because they are inexpensive, durable and easily shaped into parts. However, plastics tend to release volatile organic compounds over time, particularly in the harsh environment of a gas laser head assembly This "outgassing" of organic molecules significantly contributes to a shorter gas lifetime.

The problem of organic molecule outgassing has been identified by others. See, for example, Tennant et al., "Long-Life, Maintenance-Free Excimer Lasers", *Proceedings of the Conference on Laser Eng. and Optics*, Abstract No. TUU1 (1988). In this presentation, the authors suggested that elimination of organic materials and careful selection of metals and seals can extend laser gas life. However, this approach would preclude the use of plastic components.

Accordingly, there exists a need for better materials for use in gas laser excitation chambers. Compositions which can be inexpensively and readily fabricated into laser head assembly elements and withstand the conditions experienced during laser operation without contributing to the degradation of the working gas medium would satisfy a long felt need in the art.

SUMMARY OF THE INVENTION

Plastic or polymeric materials can be rendered substantially more practical for use in gas laser systems, and the problem of gas contamination due to outgassing of volatile materials can be significantly reduced by coating the polymeric elements with a thin, dielectric film.

In accordance with the invention, the polymeric elements are coated with a dielectric, thin film which is chemically and physically resistant to ultraviolet radiation, can withstand electrical and mechanical stresses of the plastic elements, and is chemically and physically resistant to Chemical species in the excitation medium. The bond between the dielectric thin film and the polymeric elements also is able to withstand thermal expansions and contractions o: the plastic without fracturing.

BRIEF DESCRIPTION OF THE DRAWINGS

FIG. 1 is an overall schematic diagram of a laser head assembly according to the invention; and FIG. 2 is an end view of the laser head assembly of FIG. 2.

DETAILED DESCRIPTION

In FIGS. 1 and 2, a laser head assembly 20 is shown compressing a containment vessel 38 and top plate 36 which together define a laser chamber 46 enclosing a laser medium 32. Within the chamber, a first electrode 22 and a second electrode 24 are disposed together with an array of spark-inducing elements 26. For simplicity, only a few of the excitation elements 26 are shown in FIG. 1.

With further reference to FIG. 1, the containment vessel 38 also includes mirrors 50, 52 which define the resonant cavity of the laser. Mirror 52 is partially transmissive and thereby allows extraction of the laser beam through an output port. The mirrors 50, 52 can be formed, for example, by reflective coatings on calcium fluoride windows. Also disposed within the containment vessel 38 is a blower turbine blade 56, operated by blower motor 58 to circulate the medium 32 between electrodes 22 and 24. All of the electrical elements, as shown in FIG. 1 are preferably controlled by a microprocessor or the like located outside of the containment vessel.

In order to minimize stagnant pockets and eddy currents, the electrode 22 and the floating electrode 24 can be formed by elongated rail-shaped elements, disposed opposite each other and each presenting a smooth, curved equipotential surface to the other. The rail-shaped elements are supported by a plurality of support posts 34. The spaces between the support posts 34 serve to ventilate the electrodes 22, 24, allowing the laser medium to flow with less obstruction.

FIG. 2 presents a side view of the laser, showing the relationship of the electrodes 22, 24 and two individual spark-inducing elements 26 most clearly. In operation, a high voltage pulse from voltage source 40 is applied directly to electrode 22 and indirectly via capacitors 42 to the spark-inducing elements 26. The elements 26 serve to pre-ionize the laser medium 32 in the vicinity of the electrodes 22, 24 and trigger a discharge from electrode 22 to electrode 24, which is typically grounded via ground plate 30 and vessel body 38. Also shown in FIG. 2 is a top plate 62 and a flow channel 60, preferably formed from a high temperature fluorocarbon polymer, such as polyvinylidiene difluoride, polytetrafluoroethylene, or polychlorotrifluoroethylene.

The above description is typical of the structural elements found in Transversely Excited Atmospheric lasers (TEA lasers). Such lasers often contain laser gas media which are chemically aggressive and bind easily with other atoms and molecules within the containment vessel. This results in a diminished concentration of the excitation medium over a period of time. The interaction of the medium with the materials in the chamber can also produce gaseous chemicals which significantly interfere with the generation of laser pulses.

The invention is useful in a wide variety of gas laser systems, including excimer lasers, such as Argon Fluoride, Xenon Chloride, Krypton Chloride, Krypton Fluoride, as well as molecular Fluoride lasers.

The discharge which produces the laser pulse also produces transient UV radiation. The UV radiation further stimulates chemical reactions which produce chemically aggressive molecules. The chemically aggressive molecules often contain atoms of F, Cl, C, H and noble gases in their molecular structures. As these aggressive molecules come in contact with plastic surfaces in the chamber, more contaminating molecules are released from the plastic surfaces into the gas.

In the present invention, the exposed surfaces of plastic structural components within the chamber 46 are coated with a thin dielectric film to protect them from reaction with the excitation medium and to retard or prevent outgassing of volatile organic molecules which might otherwise foul the excitation medium. In one preferred embodiment, the top plate 36, flow channel 60 and blower blades 56 described above are coated in accordance with the present invention.

The material used for the dielectric layer is preferably chemically and physically resistant to all chemical species in the chamber present during laser operation. The material should also be resistant to UV radiation and non-hygroscopic. The protective layer thus formed prevents the diffusion of organic molecules out of the plastic into the laser gas, it protects the surface of the plastic from UV radiation, and it protects the surface of the plastic from radical transients and other aggressive chemical species that exist in the gas during laser operation.

Suitable coating materials include Alumina ($Al_2O_3$), Titania ($TiO_2$), Magnesium Chloride ($MgCl_2$), Hafnium Oxide ($Hf_2O_3$), Magnesium Fluoride ($MgF_2$), Calcium Fluoride ($CaF_2$), Yitrium Fluoride ($YF_3$), Cadmium Fluoride ($CdF_2$), Lead Fluoride ($PbF_2$), Hafnium Fluoride ($HfF_4$), Strontium Fluoride ($SrF_2$), Thorium Fluoride ($ThF_2$), or Barium Fluoride ($BaF_2$).

Numerous methods are known in the prior art for film deposition. For example, chemical or photochemical deposition can be employed. This technique generally relies on localized pyrolysis or decomposition of one or more carrier gases with the subsequent formation of a film on a substrate.

Sputter deposition can also be used. This technique generally involves the evaporation or ejection of material from a target material source following heating or the impact of energetic sputtering electrons or ions.

In another approach, "ion plating" or "plasma plating" can be practiced. In this method, raw material is placed within an evacuated chamber opposite a substrate. A high voltage AC or DC field is produced between the raw material and the substrate. The chamber is filled with a gas at a pressure sufficient to generate and sustain a plasma discharge. The raw material is then vaporized and forms a deposit on the substrate. Plasma derived vapor deposition techniques include plasma enhanced and plasma assisted methods, as know in the art.

A variation of such vapor deposition techniques known as ion-assisted vapor deposition is particularly useful for depositing thin films of insulative materials on a substrate. In this technique, raw materials are vapor deposited on the substrate, while the substrate is bombarded by ions of selected gas. During the process, the substrate can be maintained in an atmosphere of the selected gas, and a radio frequency (RF) field can be established to produce a plasma of the gas in the vicinity of the substrate. In another variation, a laser can be used to assist in deposition by irradiating the substrate while it is coated.

Using any of the above-identified techniques, the coating material can be deposited directly onto plastic surfaces which are preferably at about 100° C. or less. The plastic materials have been found to deform at greater temperatures. The dielectric coatings useful in the present invention preferably range from about 20 nanometers to about 20 micrometers in thickness.

For a further description of deposition techniques useful in the practice of the present invention, see U.S. Pat. No. 4,340,617 issued Jul. 20, 1982; U.S. Pat. No. 4,888,203 issued Dec. 19, 1989; Coli et al., Vol. 15, *Applied Optics*, pp. 1327–1330 (1976) and Beatty "Thin Films" in *Handbook of Materials and Processes for Electronics*, pp. 11-1 to 11-59 (Harper Ed., 1970) all of which are incorporated herein by reference.

In accordance with the invention, plastic or polymer elements to be used within a laser can be coated with a dielectric material. These coated elements enhance the gas lifetime of the excitation media in the gas laser.

What is claimed is:

1. In a gas laser apparatus having a gaseous laser medium and excitation elements enclosed and supported with a chamber by structural elements, the improvement comprising:
    at least one structural element fabricated of a polymeric material and having a thin dielectric film covering all exposed surfaces of said polymeric element within said chamber, said film serving as a protective coating to retard outgassing of volatile organic molecules into said chamber from said polymeric material.

2. The apparatus of claim 1 wherein said gas laser apparatus is a TEA laser.

3. The apparatus of claim 1 wherein said gas laser is an excimer laser.

4. The apparatus of claim 1 wherein said gas laser is a molecular $F_2$ laser.

5. The apparatus of claim 1 wherein said thin film is non-hygroscopic.

6. The apparatus of claim 1 wherein said thin film can withstand thermal and mechanical expansions of said polymeric element.

7. Apparatus of claim 1 wherein said thin film comprises a material selected from the group consisting of Alumina ($Al_2O_3$), Titania ($TiO_2$), Magnesium Chloride ($MgCl_2$), Hafnium Oxide ($Hf_2O_3$), Magnesium Fluoride ($MgF_2$), Calcium Fluoride ($CaF_2$), Yitrium Fluoride ($YF_3$), Cadmium Fluoride ($CdF_2$), Lead Fluoride ($PbF_2$), Hafnium Fluoride ($HfF_4$), Strontium Fluoride ($SrF_2$), Thorium Fluoride ($ThF_2$), or Barium Fluoride ($BaF_2$).

* * * * *